United States Patent [19]
Rosenthal

[11] Patent Number: 6,148,301
[45] Date of Patent: Nov. 14, 2000

[54] INFORMATION DISTRIBUTION SYSTEM

[75] Inventor: Joseph S. Rosenthal, Atlanta, Ga.

[73] Assignee: First Data Corporation, Atlanta, Ga.

[21] Appl. No.: 09/108,796

[22] Filed: Jul. 2, 1998

[51] Int. Cl.[7] .................................................. G06F 17/30
[52] U.S. Cl. ................................................ 707/10; 707/3
[58] Field of Search ........................ 707/3, 10; 345/333, 345/327; 455/4.2

[56] References Cited

U.S. PATENT DOCUMENTS

| | | | |
|---|---|---|---|
| 4,554,418 | 11/1985 | Toy | 179/2 DP |
| 4,812,843 | 3/1989 | Champion et al. | 340/905 |
| 4,941,170 | 7/1990 | Herbst | 379/100.07 |
| 4,974,254 | 11/1990 | Perine et al. | 379/100 |
| 4,994,926 | 2/1991 | Gordon et al. | 358/400 |
| 5,131,020 | 7/1992 | Liebesny et al. | 379/59 |
| 5,291,302 | 3/1994 | Gordon et al. | 358/400 |
| 5,404,231 | 4/1995 | Bloomfield | 358/400 |
| 5,459,584 | 10/1995 | Gordon et al. | 358/434 |
| 5,537,586 | 7/1996 | Amram et al. | 707/3 |
| 5,555,100 | 9/1996 | Bloomfield et al. | 358/402 |
| 5,559,611 | 9/1996 | Bloomfield et al. | 358/407 |
| 5,649,186 | 7/1997 | Ferguson | 707/10 |
| 5,657,461 | 8/1997 | Harkins et al. | 345/333 |
| 5,754,938 | 5/1998 | Herz et al. | 455/4.2 |
| 5,754,939 | 5/1998 | Herz et al. | 455/4.2 |
| 5,835,087 | 11/1998 | Herz et al. | 345/327 |

OTHER PUBLICATIONS

*PR Newswire,* Aug. 11, 1982, (Distribution: To Financial).
*PC Week,* Sep. 1, 1987, "RCA International service could cut Fax cost to Japan . . . ".
*PR Newswire,* Oct. 13, 1987, "New System Cuts Costs, Increases Value of Fax Communications".
*Network World,* Oct. 19, 1987, "RCA Introduces Links, Fax Service and Gateway".
*InfoWorld,* Oct. 26, 1987, Packer–Switched Network Updates Fax Technology.
*Data Communications,* Nov., 1987, "Fax Muscle".
*Network World,* Nov. 2, 1987, "U.S. Fax to Offer Packet Fax Service".
*PC Week,* Nov. 17, 1987, "Zap Mail's Loss is Fax Services Gain"; Section 2: Connectivity.
*Link–UP,* Nov., 1988, "Xpedite Launches Fax Software".
*Los Angeles Times,* Nov. 4, 1988, MCI Pioneering Separate Network for Fax Messages.
*PC Computing,* Mar. 1989, "The Fax is in the Mail".

Primary Examiner—Thomas G. Black
Assistant Examiner—Frantz Coby
Attorney, Agent, or Firm—Sidley & Austin

[57] ABSTRACT

A subscription facsimile system of the type in which providers supply new documents for storing the images thereof in a centralized database. Subscribers register with a system as to one or more subject matter areas of interest. A processor cyclically scans the document database for new documents that have been added thereto. The processor correlates the subject matter of the newly added documents to the identity of the subscribers having an interest in the same. The new documents are then transmitted by way of facsimile to the subscribers who have registered an interest in such subject matter.

20 Claims, 4 Drawing Sheets

Information Provider A Document Index

| Title | Doc. Id. | No. of Pages | No. of Docs. | Fax Time (min) |
|---|---|---|---|---|
| 1.0 Document Index | 1000 | 7 | 1 | 2 |
| 2.0 Tuberculosis Subject Matter | 2000 | 51 | 3 | 21 |
| 2.1 Tuberculosis Diagnosis | 2001 | 16 | 1 | 6 |
| 2.2 Tuberculosis Vaccination | 2002 | 12 | 1 | 5 |
| 2.3 Tuberculosis Worldwide | 2003 | 23 | 1 | 10 |
| 3.0 Polio Subject Matter | 3000 | 383 | 12 | 160 |
| 3.1 Polio Control | 3001 | 22 | 1 | 10 |
| 3.2 Polio Vaccination | 3002 | 13 | 1 | 5 |
| 3.3 Polio in Asia | 3003 | 38 | 1 | 15 |
|  | 3004 | 12 | 1 | 5 |
|  |  | 8 | 1 |  |

SUBSCRIPTION ENTRY MODULE

1. Information for Each Subscriber
   a) Information Provider ID
   b) Fax Number
   c) Password
   d) Hours of Document Delivery
   e) Document ID's or Groups Desired/Canceled for Document Delivery
   f) Full Name – If within a subscriber group having one Fax
   g) Update Information for a)-e) above
   h) Historical Data
      i) Document ID's Requested
      ii) Total Documents Requested
      iii) Number of Times the Index is Requested

FIG. 5

SUBSCRIPTION UPDATE MODULE

1. Cycle Hourly
2. Search Information Data Base for Each Updated or New Document
3. Identify Subscribers who have Requested the Updated Documents
4. Create for Each Document a Record Having:
   i) Recipient Subscriber Name
   ii) Fax Number
   iii) Document ID
5. Transmit the Record as a Broadcast Request to the Transaction Handling System

*FIG. 6*

DOCUMENT DELIVERY MODULE

1. Receive Broadcast Request from Subscription Update Module
2. Decode the Broadcast Request Record
3. Retrieve Image Data Corresponding to Document ID
4. Select Idle Fax Port
5. Dial Fax Number
6. Transmit Document Image
7. If Not Deliverable, Make a Subsequent Attempt
8. Make Record if the Document Cannot be Delivered
9. Update Historical Record of Customer

*FIG. 7*

INFORMATION DISTRIBUTION SYSTEM

TECHNICAL FIELD OF THE INVENTION

The present invention relates in general to information distribution systems, and more particularly to systems for storing data, text and other types of information, and for distributing the information to subscribers in an efficient and timely manner without incurring either duplicated distributions or distribution to subscribers who are not interested in the particular information.

BACKGROUND OF THE INVENTION

Many aspects of a person's personal and business life depend on the availability of information from many sources. Indeed, the decisions that are made in a person's day-to-day life depend in a large part on the information that is not only available, but that which is actually received and considered by the individual. It can be appreciated that information that is available may nonetheless not be received or considered if the availability thereof is not sufficiently convenient. For example, libraries include thousands of sources of information, but the accessibility thereof is somewhat inconvenient, in that people must actually go to the libraries, look through the various indices of the authors, subject matter, etc., and then actually find the publication and study the same. The current use of the Internet and the associated mass of information has been widely accepted and used, primarily because of its ease of accessibility.

As noted above, the effectiveness of information depends on the speed, efficiency and reliability thereof. Timely accessibility and delivery increases the value of the information. An important technology that is widely used to facilitate the speed and delivery of the information, especially documents, is the facsimile (fax) mode of transmission. Fax delivery systems of the type that provide documentary information are available in two general categories. First, "fax broadcast" systems are utilized for delivering the same document at the information provider's request to a number of recipients at approximately the same period of time. On the other hand, "fax-on-demand" systems are available where an information provider places documents on a system and recipients can make telephone calls to request the desired documents. Both such systems are generally successful, but have serious deficiencies and limitations. The fax broadcast system is inefficient because it transmits all documents to all recipients identified on a list, regardless of whether the recipients are actually interested in the contents of the documents. Also, serious concerns remain with respect to the fax broadcast system in that the transmittal of unsolicited facsimile documents may violate various governmental rules and regulations.

A major shortcoming of the fax-on-demand system is its inefficiency, in that it requires a request of the information each time the recipient desires such information. Moreover, the recipient has no way of knowing when the information source has been changed, modified or even deleted.

The deficiencies of both the fax broadcast and fax-on-demand systems can be appreciated from the following example.

A hypothetical document distribution system is provided by the Center for Disease Control. The system satisfies a need to distribute a wide variety of warnings, notices and memoranda about diseases, viruses, diagnoses, treatments, medicines, etc., by fax to a large target group of doctors and technicians. The documents can be distributed by either the traditional fax broadcast technique, or the fax-on-demand technique. In view that there can be tens of thousands of medical facilities included in the target group, there exists many documents that are not relevant to each of the facilities. As such, the fax broadcast technique is inefficient and very expensive. On the other hand, the fax-on-demand technique is impractical because the recipients have no way of knowing when new information becomes available, in view that the number of documents available is extremely large.

From the foregoing, it can be seen that a need exists for a new document distribution technique that is more efficient as to the distribution system, as well as the recipient. Another need exists for a new information distribution technique that allows recipients to receive only the information to which an interest exists, and automatically receive such information in a timely manner. Yet another need exists for an information distribution technique which allows recipients the capability to easily change or modify document requests such that new subject matters are easily added, and that the distribution of current subject matters are easily discontinued.

SUMMARY OF THE INVENTION

In accordance with the preferred embodiment of the invention, an information distribution system and method of operation thereof is disclosed for reducing or overcoming the shortcomings and disadvantages of the prior art techniques. In a preferred form of the invention, there is provided an information database for storing vast amounts of information and for providing high speed access thereto. The information database is adapted for allowing new and updated information to be easily added thereto at any time. In one application of the invention, the information database stores picture and character images of documents, as supplied to the system by way of facsimile and otherwise. A subscription database is provided for storing the identity of each subscriber or recipient. In addition to storing the identity of each subscriber, there is stored the subject matter areas of interest to the subscribers, as well as other necessary information.

A processor is programmed to cyclically scan the information database to determine if any new documents have been added thereto. As to any new documents that have been added to the information distribution system, the processor then scans the subscription database to identify each subscriber that has an interest in the subject matter of the new document. When the subject matter of the new documents has been correlated to the subscribers having an interest therein, the system causes an automatic transmission of the new documents to each subscriber having an interest therein. With this arrangement, the subscribers do not receive information in which they have no interest, nor are the subscribers required to formally request the new information as a prerequisite for its delivery to the recipient.

In accordance with another feature of the invention, the information distribution system is adapted for receiving communications from subscribers via facsimile, telephone calls, the Internet, etc., in which new subscribers can initially be registered with the system, and which current subscribers can add new areas of interest, delete others, and otherwise modify various parameters by which the information is delivered to the recipient.

In the preferred form of the invention, the information stored in the database is of the documentary-page type, and the distribution is by way of a facsimile engine to the various subscribers.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same elements or parts throughout the views, and in which:

FIG. 4 is illustrative of an example document index and the various subject matters provided by an information provider;

FIG. 5 is a listing of the types of parameters and data that are utilized for registering a subscriber with the system;

FIG. 6 is a listing of the functions carried out by a subscription update software module that cyclically scans the database for the appearance of new documents; and FIG. 7 is a listing of the functions carried out in accordance with a document delivery software module for transmitting the information to a subscriber having an interest in the same.

DETAILED DESCRIPTION OF THE INVENTION

Figure 1:
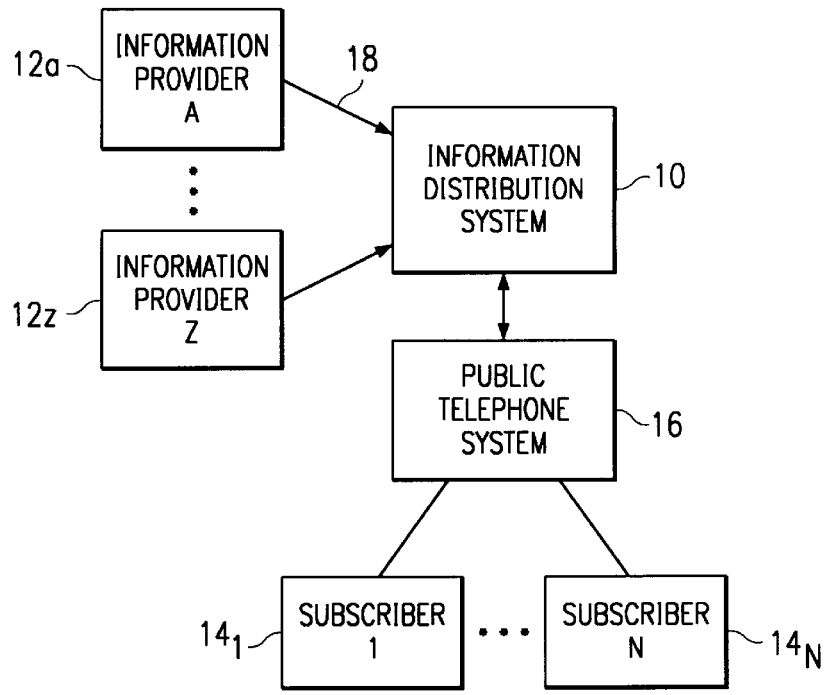
FIG. 1 is a generalized block diagram of the information distribution system, as electronically coupled to information providers and recipients who are registered as subscribers to the information delivery system.

With reference to FIG. 1 of the drawings, there is illustrated in block diagram form the connection of an information distribution system 10 between plural information providers $12_a$–$12_z$ and plural subscribers $14_1$–$14_n$. The term "subscribers" is used synonymously with the term "recipients". When the communications between the information distribution system 10 and the subscribers 14 is by way of facsimile, such as is the case in the preferred embodiment of the invention, the public telephone system 16 provides the switched communications connection therebetween. As will be described more fully below, the subscribers 14 automatically receive new information of interest that has been input to the information distribution system 10. In addition, provisions are made for allowing any new subscriber to communicate with the information distribution system 10 to register as a subscriber for receiving information in different selected subject matter areas.

The information providers 12 can supply information to the distribution system 10 by way of facsimile and through many other mediums. Of course, the interface between the information providers 12 and the distribution system 10 would include suitable circuits for converting the input information to appropriate digital signals for storing on high speed mass storage devices, such as multiple disk drives. The information provers $12_a$–$12_z$ may each be involved in entirely different subject areas, all of which is stored in the information distribution system 10 and distributed in a timely manner to the various subscribers 16. For example, one information provider $12_a$ may be involved in the control of diseases and may wish to have such information available only to those subscribers who are interested in the particular subject matter area. Another provider $12_z$ may be involved in automotive maintenance, which information will again be stored on the information distribution system 10 and made available to yet other subscribers, such as mechanics. A host of other diverse subject matter areas can be provided by other information providers, and stored in the system 10 so as to be available to the subscribers who have an interest in the same.

In a practical application, the information providers 12 may additionally provide goods and/or services to the subscribers outside of the system 10, while using the information as an incentive for doing business with the respective information providers 12. To that end, it is anticipated that the subscribers 14 will not have to pay a service fee for obtaining the information from the system 10. Rather, each time a new document or information is transmitted from the system 10 to a subscriber 14, the respective information provider 12 can be billed accordingly. Many other charge and payment schemes can be utilized by those skilled in the art. With the utilization of the invention for the distribution of information, the sales of goods and services by the information providers 12 can be facilitated. Indeed, new product information, product brochures, press releases concerning products, etc., can be made readily available to the subscribers, via the information distribution system 10.

Figure 2:
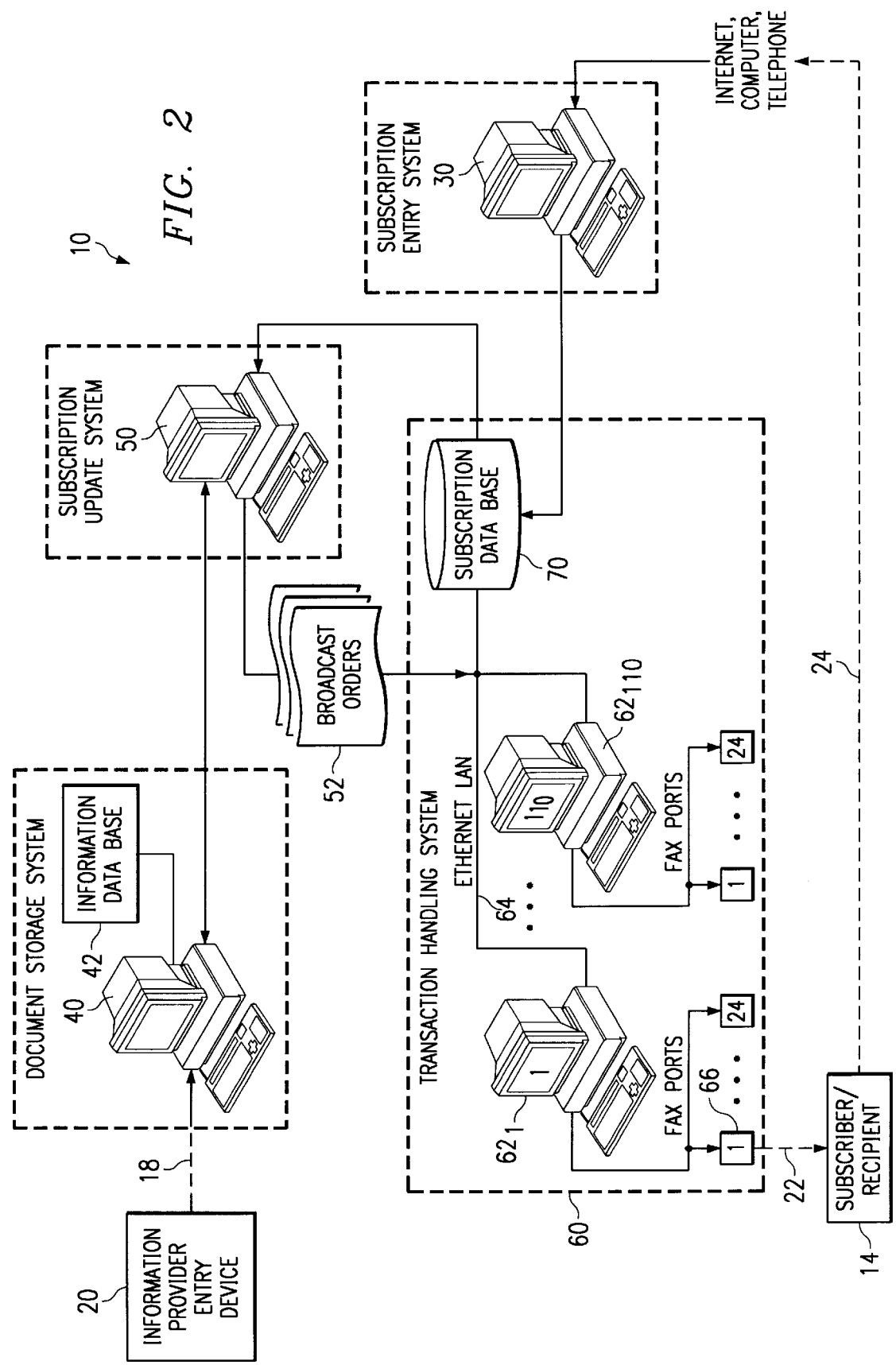
FIG. 2 is a block diagram of the information distribution system constructed according to a preferred embodiment of the invention.

With reference now to FIG. 2, there is shown a more detailed block diagram of the information distribution system 10, as coupled to one information provider entry device 20 by way of the communication line 18. It should be understood that many other information providers 12 would typically be coupled to the system 10. In the preferred embodiment of the invention, the information provider entry device 20 comprises a facsimile machine for transmitting standard facsimile format signals, such as the T30 fax protocol, on line 18 to the information distribution system 10. A subscriber 14, or recipient, receives a facsimile transmission by way of the communication line shown by the broken line 22. Moreover, the subscriber 14 can communicate with the information distribution system 10 by a communication medium 24 which may include the Internet, a computer line, telephone line, etc. In the preferred form of the invention, new subscribers can communicate with the information distribution system 10 on various communication mediums 24 when initially registering with the system to receive facsimile transmissions concerning specific subject matter areas.

The major functional subsystems of the information distribution system 10 include a subscription entry system 30 in which registration information from new subscribers is entered into a subscription database 70; a document storage system 40 for storing text and images input by the information providers 12 into an information database 42; a subscription update system 50 for periodically scanning the information database 42 for the occurrence of new information; and a transaction handling system 60 which comprises the facsimile engine for transmitting new documents to the subscribers interested in the subject matter thereof The transaction handling system 60 is of the same type and construction as used in the conventional facsimile broadcast system. In the preferred embodiment of the invention, up to 110 personal computers, one shown as reference number $62_1$ are connected together by an Ethernet local area network 64. Each personal computer 62 is, in turn, associated with up to 24 facsimile ports, one shown as reference numeral 66. With 110 personal computers, each driving 24 facsimile ports, a total of 2640 facsimile ports can be simultaneously driven to transmit information to the respective subscribers 14. The local area network 64 also couples the personal computers 62 of the facsimile engine to the subscription database 70. The subscription database 70 stores all the data that is uniquely related to each subscriber 14. As will be set forth more fully below, the personal computer 30 in this subscription entry system receives all of the data from the subscribers, in response to prompts and the like, and stores such data in the subscription database 70.

As noted in FIG. 2, the subscription update system 50 has access to the subscription database 70. Moreover, the subscription update system 50 also has access to the information database 42. Periodically, the subscription update system 50 reads the information database 42 to determine all new or revised documents that have been added thereto. Based on the subject matter area of each new or revised document stored in the information database 42, the subscription update system 50 accesses the subscription database 70 to determine if any of the subscribers has registered an interest in one or more of the documents. On a match between the subject matter of a new or revised document and a corresponding subscriber interested in the same, the subscription update system 50 transmits broadcast orders 52 to the transaction handling system 60 for causing a facsimile transmission of each new or revised document to the respective subscribers having an interest in the subject matter thereof. Any document that has been revised in any manner is considered as a "new" document.

The operation of the system is as set forth below. An information provider 12 utilizes an entry device 20, such as a facsimile machine, for accessing the information distribution system 10 and particularly the document storage system 40. When employing facsimile transmissions, a telephone line 18 can be utilized by dialing one or more facsimile numbers associated with the document storage system 40. Alternatively, information providers 12 can access the information distribution system 10 by way of the Internet to also convey document data, wave files, voice information, etc. Numerous other communication mediums can be utilized for transmitting the different types of information to the information distribution system 10.

The information provider 12 can classify and prioritize the subject matter of the documents, as well as the information data in numerous different ways. Various parameters can also be transmitted according to a predefined format, in association with the information data. Such parameters may include the title of the document, the document identification, the number of pages, information provider identification number, a password, the expiration date and/or effective date of the document, the approximate facsimile time of the document, priority, and other possible helpful information. Such data is stored in the information database 42 in the manner transmitted by the information provider entry device 20. Importantly, the information and all associated parameters are stored in the information database 42, in the manner substantially identical as transmitted by the information provider 12.

Figure 3:
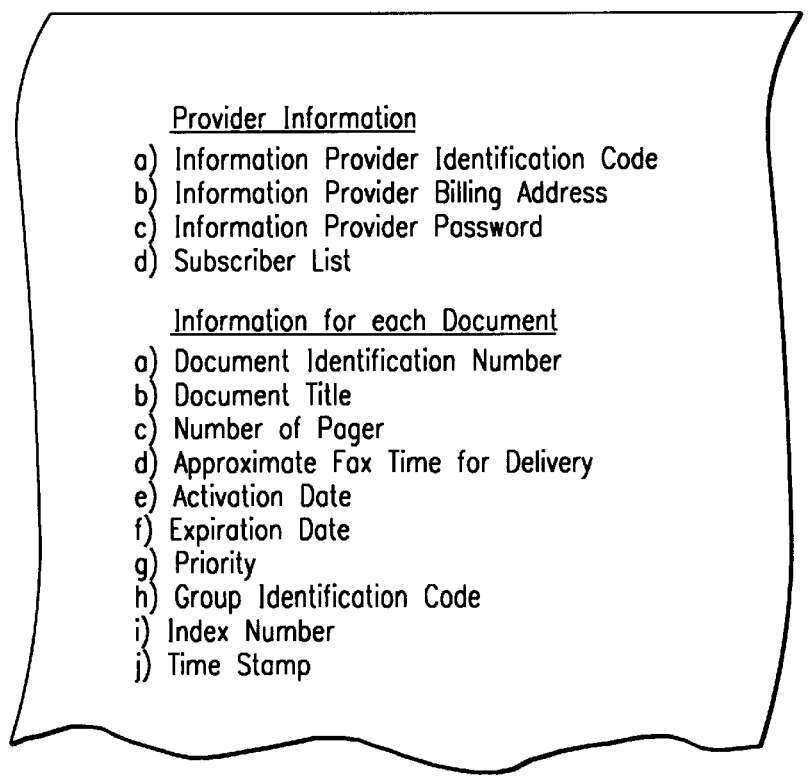
FIG. 3 is a listing of the data and parameters required in the preferred embodiment for each information provider as well as for the data for adding information to the information database.

The sophistication or format in which the data is stored in the database 42 is primarily a function of versatility or efficiency by which the data can be searched, categorized and found. In the preferred embodiment of the invention, each document is stored in association with the following parameters, shown more fully in FIG. 3. The record stored in the data base for each document includes a number of fields, each storing the various parameters. An identification code unique to each information provider 12 is transmitted by the entry device 20. With such a code, the information distribution system 10 can maintain separate records of each information provider 12. The billing address for the information provider is also stored so that at the end of each billing period, the information provider is billed, based on the number of times subscribers requested each document. A password associated with the information provider may also be required. Lastly, the data base may store a subscriber list which identifies each of the subscribers authorized by the information provider to subscribe to and obtain facsimile transmissions of the provider's documents. Next, the transmission of each document by an information provider 12 to the system 10 is preferably accompanied by a password that verifies a valid transmission by the information provider to be stored in the associated file. This password is verified by the information distribution system 10. This prevents hackers and other unauthorized persons from intentionally or inadvertently transmitting files for storage in the wrong data base files.

Each document registered with the information distribution system 10 includes a document identification number or code that uniquely identifies the document. This ID number is assigned to each document by the system 10. The title of the document, the number of pages, the approximate fax time for delivery, the activation date, the expiration date and a priority (if any) are also transmitted with the document to the system 10. If the information provider 12 has more than one group of subject matter areas, then each group is identified by a unique identification number. This allows the documents of each group to be maintained in a separate file so that the subject matter areas can also be maintained and accessed separately. This group identification code also allows a subscriber to simply request receipt of a group of documents in the same subject matter area without requesting the documents individually.

In addition to the document information stored in the database 42, the information provider 12 may also provide a document index 80, an example of which is shown in FIG. 4. Here, the document index 80 is preferably a document itself that is prepared by the information provider 12 and transmitted upon request to a subscriber 14. The document index 80 lists the various groups of all of the documents provided by the information provider 12. In the document index 80 shown in FIG. 4, it is noted that the index itself is identified as document identification 1000, having seven pages, comprising a single document, and requiring about two minutes of facsimile time for transmission thereof. The index 80 also shows that a first subject matter group 2.0 pertains to tuberculosis, while a second subject matter group 3.0 relates to a polio subject matter. The specific documents within the tuberculosis subject matter group 2.0 include tuberculosis diagnosis document identification 2001, tuberculosis vaccination document identification 2002 and tuberculosis worldwide document identification 2003. Each of the three individual documents 2.1–2.3 are associated in the index 80 with the number of pages, the number of documents and the approximate facsimile time. If all documents in the tuberculosis subject matter area are desired, then the group 2.0 can simply be requested, in which event all 51 pages of the three documents will be transmitted, which facsimile transmission time will be about 21 minutes.

The second subject matter group shown in the index 80 of FIG. 4 illustrates a polio group 3.0, having a total of 383 pages comprising 12 documents, with an approximate facsimile time of 160 minutes. Listed under the polio subject matter group 3.0 are the numerous individual documents, only a portion of which are shown. While the index 80 of FIG. 4 is illustrative of the many variations that are possible, those skilled in the art may desire to provide a much more expansive index, a simplified index, or no index at all. As will be set forth below in more detail, when a subscriber or recipient 14 initially registers with the information distribution system 10, the recipient may request that the document index 80 be transmitted with the transmission of each new document. Alternatively, the recipient 14 may request that an index 80 of the particular information provider 12 only be transmitted once a week, once a month, etc., irrespective of the number of documents transmitted therebetween. Each information provider $20_a$–$20_z$ can add new documents or information to the information database 42 at any time whatsoever.

The subscription entry system 30 is provided so that current subscribers can access the system and request a facsimile transmission of any document, including the document index 80, provided by the respective information providers 12. As noted above, it is contemplated that each information provider will supply to the information distribution system 10 a listing of all of the subscribers who can request documents provided by the respective information provider 20. This prevents unauthorized subscribers from requesting the transmittal of unnecessary documents for the sole purpose of running up the bill charged by the information distribution system 10 to the providers 12. In order for a subscriber/recipient 14 to request a document, the document identification code can be transmitted on a medium 24 according to a specified format, together with the subscriber identification code and other relevant information, as may be required. Alternatively, the subscriber 14 can request documents by way of the Internet and the use of a checklist, by telephone or other suitable means.

Returning to FIG. 3, there is written in a field of the data base record of each document a calendar date and time of day in which the document was registered with the system 10. By date and time stamping each document, it can be readily ascertained whether other documents having the same title are newer versions.

In addition to the request of documents, the subscription entry system 30 is also programmed to allow new subscribers to register therewith, so as to automatically receive any or all new documents that have been stored in the information database 42 by the respective information provider 20. The registration on the information distribution system 10 by a new subscriber 14 may also carried out by way of facsimile transmission, Internet, computer data, telephone, etc. When using a telephone to request documents or to be registered as a new subscriber, either operators or interactive communications via voice prompts may be employed. The relevant information to be transmitted from the new subscriber to the subscription entry system 30 is shown in FIG. 5, and comprises the facsimile number of the subscriber, a password assigned to the subscriber by the information provider 20, the group identification code pertaining to the subject matter of interest to the subscriber, and the hours between which new documents can be transmitted to the subscriber 14. Of course, in the event that the new subscriber 14 is associated with a group of recipients utilizing the same facsimile machine, then the name of the recipient may additionally be required. When registering by way of the Internet, the subscriber can access the web site of the information distribution system 10, whereby a checklist is provided to enter the information noted above. Further, the document index 80 provided by the information provider 12 may also be accessible, whereby the new subscriber 14 simply checks the relevant box beside each group, or each document, to indicate an interest therein. In accordance with an important feature of the invention, current subscribers can additionally access the subscription entry system 30 to modify the associated registration information, such as when a new facsimile number is to be used, new areas of interest in either groups or documents are added, or deleted. If, for example, the recipient 14 intends to be absent for a period of time and desires that no documents are to be transmitted, then the check marks of all of the boxes relating to the groups or documents are deleted, whereby the recipient remains registered with the system, but no documents are delivered until the recipient again provides the relevant information as to the subject matter areas.

The subscriber registration data entered into the subscription entry system 30 is stored in the subscription database 70, as shown in FIG. 2. As noted in such figure, subscriber data stored in the subscription database 70 is available to the subscription update system 50.

According to an important feature of the invention, the major functions carried out by the subscription update system 50 are shown in FIG. 6. The update system 50 is programmed to operate on a cyclical basis, and preferably about once each hour, to access the information database 42 and identify each new document that has been entered into the information distribution system 10 during the immediate preceding hour. For each new document entered into the system 10 during such time period, a transaction record is generated. The transaction record includes the document ID and data related to the subject matter of the document. The subscription update system 50 searches through the entire information database 42 for each new document. As noted above, a transaction record is generated for each such document found. Then, the subscription update system 50 accesses the subscription database 70 to find a correlation between the subject matter of each new or revised document, and the subscribers registering an interest in such subject matters. If there is no correlation found between the subject matter of the new documents and at least one subscriber, then the corresponding transaction record is not transmitted. On the other hand, as to all of the subject matter areas of the new documents in which there is a correlated subscriber, the record of each new document is completed with the name and facsimile number of the subscriber. One transaction record for each new document in which there exists a subscriber having an interest in the subject matter thereof is transmitted in a serial manner as a broadcast order 52 shown in FIG. 2. The broadcast orders 52 are transmitted to the local area network 64 for distribution to the respective personal computers $62_1$–$62_{110}$ of the transaction handling system 60.

The image data of each new document is not part of the respective transaction record. Rather, when the transaction record is assigned to a particular personal computer 62 in the transaction handling system 60, such personal computer decodes the various fields of the transaction record. The outbound facsimile port then dials the facsimile number using the document ID as an index. Prior to the dialing of the facsimile number of the subscriber, the personal computer 62 retrieves the image data of the respective document from the information database 42. With such information, when the facsimile machine of the subscriber responds by going off-hook, the document image is delivered.

The format of delivery can be of different variations, including a face or header sheet having the recipient's name, and any other information desirable. In the event the subscriber's facsimile machine is unavailable for receiving the transmission, such as being in use, out of paper, etc., the personal computer 62 will attempt a retransmission after a predefined delay period. After a predetermined number of attempts to deliver the document image, the personal computer 62 of the transaction handling system 60 will flag the record as undelivered. Records flagged as such can be queued so as to reattempt transmission during the next cyclical period.

The personal computer 62 of the transaction handling system 60 is also programmed to maintain historical records and other administrative records for billing purposes. To that end, a billing record is generated to indicate for each information provider 12 the cumulative number of each document delivered, the recipients to whom the document was delivered and the time required for facsimile delivery. This information is employed and gathered on a monthly basis so that each information provider 12 can be billed accordingly. Moreover, such historical data is made available to each information provider 12 for "housekeeping purposes", so that documents never or seldom requested can be deleted from the system.

From the foregoing, it can be seen that the information delivery system facilitates the dispersal of information in an efficient manner. Unlike the traditional facsimile broadcast technique, the documents are delivered only to those recipients who have an interest in the subject matter thereof. Unlike the fax-on-demand technique, new documents entered into the system are automatically delivered to the recipients interested in the same, without such recipients having to make specific requests for each such delivery. Shown and described above are the fundamental novel features of the invention, as applied to the preferred embodiment. It will be understood that various omissions, substitutions and changes in form and detail of the invention as described herein may be made by those skilled in the art, without departing from the true spirit and scope of the invention as defined by the appended claims. Therefore, it is the intention that the invention be limited only by the scope of the following claims.

While the preferred embodiment of the invention has been described in connection with plural programmed processors or personal computers, the entire system can be controlled centrally by the use of a programmed mainframe computer, or the like. As such, the various software modules would be incorporated together, or executed individually by the mainframe computer.

What is claimed is:

1. An information distribution system, comprising:
   an information database for storing information, and to which new information can be added;
   a subscription database for storing an identity of each of a plurality of subscribers, and for storing an area of subject matter interest of each said subscriber;
   a processor programmed to periodically cause accessing of said information database to identify the new information that has been added thereto subsequent to a prior periodic accessing of said information database; and
   said processor being programmed to cause accessing of said subscription database to identity each subscriber having an interest in the new identified information, and said processor causing an automatic transmittal of the new identified information to respective subscribers having an interest therein, whereby the respective subscribers receive said new identified information without having specifically requested the same.

2. The information distribution system of claim 1, wherein said information database is adapted for storing images of documentary information, and each document is associated with an identification code.

3. The information distribution system of claim 1, wherein said new information is associated with a code relating to a subject matter of the information, whereby different subject matter codes are employed with different information that relate to different subject matter areas.

4. The information distribution system of claim 1, wherein said subscription database includes in association with each subscriber identity, a facsimile number, and wherein said transmittal of said information is by way of facsimile.

5. The information distribution system of claim 1, further including an index stored in a database, said index identifying different groups of said information.

6. The information distribution system of claim 5, wherein a plurality of documents having a similar subject matter are stored as a group such that retrieval of the group retrieves all the documents belonging to the group.

7. The information distribution system of claim 6, wherein in response to a request by a subscriber of a group, each document belonging to the group is transmitted to the subscriber.

8. The information distribution system of claim 1, further including subscription entry apparatus, said apparatus including means for allowing subscribers to communicate with said information distribution system to input one or more subject matter interests, and means for associating the subject matter interest with the subscriber.

9. The information distribution system of claim 1, wherein new information entered for storage in the system is assigned a subject matter thereto and assigned an information identification code, and at periodic intervals said processor identifies the new information entered into the system since a prior time interval, correlates the subject matter thereof to subscribers who have an interest in such subject matter, and causes transmission of the new information to only those subscribers who have an interest therein.

10. A method of distributing information, comprising the steps of:
    providing information to an information database from a plurality of information providers, each information provider being identified by a unique code;
    providing by each said information provider an identity of each subscriber who can request the information provided to said information database by the respective information provider;
    storing the information supplied by the information provider in the information database in association with a subject matter area thereof;
    storing the identity of each of a plurality of subscribers in a subscriber database, and storing a subject matter interest of each said subscriber;
    accessing the information database to determine subject matter areas and accessing the subscriber database to identify the subscribers having an interest in the subject matter area; and
    transmitting the information to the respective subscribers having an interest in the subject matter area thereof.

11. The method of claim 10, further including periodically accessing the information database to determine new information added to the information database, and then identifying the subject matter area of the new information.

12. The method of claim 11, further including transmitting information to a subscriber that has been specifically requested, where the information is not new information.

13. The method of claim 10, further including storing an index in said information database, said index defining the subject matter areas and an identity of the information corresponding to the subject matter areas.

14. The method of claim 13, further including allowing subscribers to subscribe to the index.

15. The method of claim 13, further including storing a different index for each of said plurality of information providers providing the information for storage in the information database.

16. The method of claim 10, wherein said information comprises documents, and further including storing in a common group different documents having a similar subject matter area.

17. The method of claim 16, further including allowing a subscriber to request a group subject matter area, whereupon each document assigned to the group is transmitted to the subscriber.

18. The method of claim 10, further including transmitting the information to the subscriber by way of facsimile.

19. The method of claim 10, further including allowing by said subscriber access to the information stored in said information database without charge, and charging an access cost of subscribers to said information providers for access by each subscriber to the respective information.

20. A document distribution system, comprising:

data entry apparatus including a processor and a document database for receiving and storing data corresponding to document images, said processor being programmed to store in association for each document image a document identification code, a document title, a number of pages and a subject matter of the document;

subscription entry apparatus including a processor and a subscription database for receiving data from a plurality of subscribers, said processor being programmed to store in association with each subscriber a destination transmission number, a unique password, a subject matter area of interest, and a window of time in which information can be transmitted to the user; and subscription update apparatus including a processor programmed to periodically scan said document database and scan for the existence of any new document entered as data into said system, and programmed to correlate a subject matter of each new document to a corresponding subject matter area of content to one or more of said subscribers, and programmed to cause a transmission of each new document to each subscriber in which the document subject matter matches the subject matter area of interest of the subscriber.

* * * * *